3,297,625
PAVING COMPOSITION COMPRISING AGGREGATE AND A BINDER CONTAINING A PETROLEUM RESIN, A HYDROCARBON RUBBER, AND AN OIL
Joseph Regenstein, Jr., Chicago, and John C. Tapas, Glenview, Ill., assignors to Velsicol Chemical Corporation, Chicago, Ill., a corporation of Illinois
No Drawing. Filed Aug. 13, 1965, Ser. No. 479,600
4 Claims. (Cl. 260—33.6)

This application is a continuation in part of our copending application, Serial No. 212,743, filed July 26, 1962, and now abandoned, which in turn is a continuation in part of application Serial No. 12,898, filed March 7, 1960, then copending with the latter and now abandoned.

This invention relates to new compositions of matter useful as binders for mineral aggregate, especially in the production of paving materials and the final bound product thereof. More particularly, this invention relates to binder material prepared from thermoplastic, petroleum-derived hydrocarbon resins and aromatic and/or naphthenic plasticizing oils, finding particularly valuable usefulness in the production of light colored products.

The use of asphalt for binding of aggregate materials has been practiced for many years. A typical use of such materials is in road pavements. Commonly, an aggregate mass consisting of crushed stone, gravel, sand, and combinations thereof is mixed with hot asphalt, tar, or other like bituminous mixtures and inert mineral matter, and is poured while in a heated condition to form the wearing surface of a pavement. The surface is then rolled smooth with pressure and allowed to cool. The asphalt commonly used contains bitumens, which from its inherent nature is dark in color, preventing white, light colored, and colored pavements.

Further, the aggregate paving compositions utilizing asphalt as the binding material generally have poor feathering properties as a result of which the edges of the road have a decided tendency to break off, thus requiring sloping edges. This undesirable property prevents sharp vertical pavement edges, desirable when the wear surface is to cover the sub-surface completely and evenly permitting pavement edges of uniform strength and composition. This and similar undesirable properties also prevent the molding and extruding of shapes such as building blocks, curbs, patio stones and blocks, safety islands and structures, lane dividers, culverts, and the like. Paving compositions using asphalt binders, while in a heated condition, also have the undesirable property of creeping toward and under the rollers of pressure rollers.

Thus, one object of this invention is to provide a light colored binder when dispersed into mineral aggregate whereby products of desired color may be produced by suitable pigmentation.

Another object of this invention is to provide a binding material which when combined with mineral aggregate will impart superior physical properties including rapid application, improved feathering, capability of being extruded or molded, and the like, to the resulting product.

These and other objects of the present invention will be apparent from the following description.

The essential ingredients of the binders of this invention are substantially non-polymerizable, thermoplastic, light colored hydrocarbon resin produced by polymerization of unsaturated petroleum fractions and plasticizing oil selected from the group consisting of aromatic oil, naphthenic oil consisting essentially of a mixture of cycloparaffinic compounds, and mixtures thereof, said oils being relatively viscous.

Preferable essential ingredients of the binders of this invention are: substantially non-polymerizable, aromatic, thermoplastic, hydrocarbon resin produced by polymerization of unsaturated petroleum fractions, e.g. by polymerization of "dripolene," a commonly known mixture of unsaturated hydrocarbons obtained in the high temperature pyrolysis of normally gaseous hydrocarbons, having a softening point range of from about 220° to about 300° F., a mixed aniline point of from about 20 to about 60° C., an iodine number of from about 70 to 160, an acid number of from 0 to 4, and a molecular weight of from about 600 to about 1400 as determined by cryoscopic means; and oil selected from the group consisting of aromatic oil consisting essentially of a mixture of highly viscous aromatic compounds, having a viscosity of from about 100 to about 300 S.S.U. at 210° F., and an aniline point of from about 20 to about 60° C.; naphthenic oil consisting essentially of a mixture of viscous cycloparaffinic compounds, having a viscosity of from about 50 to about 200 S.S.U. at 210° F., and an aniline point of from about 50 to about 150° C.; and mixtures thereof; said oils preferably being light in color and relatively viscous.

Hydrocarbon resins of the above description and having the properties defined herein can be readily prepared as described in U.S. Patent No. 2,798,866. This patent also defines the term "dripolene."

The quantity of each ingredient of the binder is dependent upon the physical characteristics of the ingredient and upon the characteristics and amounts of the other ingredients. The amount of oil used in the binder depends primarily upon the properties of the resin, as exemplified by the softening point. Generally, the higher the softening point of the resin, the higher the viscosity of the resin and the more oil needed to keep the viscosity of the binder at a workable level. Further, since the aromatic oils as described herein are generally of higher viscosity than the naphthenic oils herein described, a greater amount of aromatic oil would be required to lower the overall viscosity of the binder than if naphthenic oil were utilized. Conversely, if a low softening point resin were used, an aromatic oil of high viscosity would be required to raise the viscosity of the binder, whereas a large quantity of naphthenic oil would only lower the binder viscosity, and a smaller amount of oil would provide workable viscosity, but poor binding and penetration properties. Moreover, if amounts of naphthenic oil larger than described herein are used without other oils or additives, incompatibility will result and the binder will break down on cooling. Such an event will not occur within the proportions of ingredients described herein.

Aromatic and naphthenic oil ingredients of this invention are commercially available. For example, a suitable aromatic oil is one having a viscosity of about 250–270 S.S.U. at 210° F. and an aniline point of 40–50° C. which is marketed as Penola WS-3267. A naphthenic oil suitable as an ingredient for this invention is one having a viscosity of 80–90 S.S.U. at 210° F. and an aniline point of about 75° C., which is marketed as Circosol 596.

Binders prepared according to the methods described and claimed by this invention are useful for binding aggregate material. Although the exact proportions of the ingredients are not critical, and binders can be prepared from a wide range of quantities of ingredients described herein, the most suitable proportions consistent with good binding properties and wide temperature range compatibility are as follows: from about 30 to about 60 parts by weight resin described herein, having a softening point from about 220° to about 300° F. and from about 40 to 60 parts by weight oil or oil mixture as described herein.

An example of this invention is a binder composed of from 35 to 45 parts by weight resin described herein, having a softening point from about 220° to about 260° F.; from about 45 to about 55 parts by weight aromatic oil, described herein; from about 2 to about 10 parts by weight naphthenic oil described herein; and from about 1 to about 6 parts by weight of a natural or synthetic hydrocarbon rubber such as butadiene-styrene copolymer, polyisoprene, polybutadiene and their mixtures.

A preferred example of this invention is a binder composed of about 40 parts by weight resin as herein described, having a softening point of from about 230 to about 260° F.; about 50 parts by weight aromatic oil described herein; about 6 parts by weight naphthenic oil; and about 4 parts by weight styrene-butadiene copolymer rubber.

The present invention provides colored paving material having superior physical properties, such as rapid application, improved feathering, and the capability of being extruded and molded. The essential ingredients of the paving materials of this invention are mineral aggregate such as chips of stone such as granite, crushed limestone, rock, gravel, sand, cinders, and the like, mineral dusts and fillers, and combinations thereof, and a binder of this invention.

The composition of aggregate material will vary according to the use for which the paving material is intended. For instance, if the paving material is to be used in a pavement to be subjected to unusual traffic consisting of heavily loaded trucks, a greater amount of chips up to and including ½ inch would be needed to support the load. Such a pavement would have a relatively rough surface.

On the other hand, a lesser amount of chips and a greater amount of sand and mineral dusts would be incorporated in pavement intended as a pathway upon which only pedestrian traffic would be allowed. Such a pavement would have a smooth surface.

In general, to obtain a smooth surface chips of stone and rock of only small size would be used, whereas conversely, to obtain a rough surface capable of bearing heavier loads, greater amounts of larger chips of stone and gravel would be used with lesser amounts of sand and dust.

The present invention includes the novel colored paving material comprised of from about 2 to about 10 parts by weight of binder herein described and from about 85 to about 98 parts by weight aggregate material.

Another example of this invention is a paving material comprised of from about 2 to about 10 parts by weight of a binder of this invention, from about 85 to about 98 parts by weight of an aggregate mixture consisting of sand, chips of stone or rock, mineral dusts and fillers, or any mixture or combination of them, and from 0 to about 25 parts by weight coloring pigments or mixture of coloring pigment. A typical paving material can be composed of 2 to 8 parts by weight of a binder of this invention, 30 to 50 parts by weight sand, 40 to 60 parts by weight chips of stone or rock, 2 to 10 parts by weight mineral dusts and fillers, and 0 to 10 parts by weight coloring pigment or mixtuer of coloring pigments.

The paving composition of this invention is normally light in color or can be pigmented as desired. Furthermore the pavement resulting therefrom has excellent wear and stability properties, which can be enhanced by the addition of the rubber materials aforesaid. Addition of the rubbers has been found to improve certain properties, such as ductility of the pavement when the binders of this invention are used to bind aggregate materials to form a pavement.

The rubber additives are most easily usable in the form of crumbs, pellets, beads, etc., to facilitate dissolution into the solvent, and/or oil solution.

The binding material of this invention can be readily made by blending a heated mixture of the synthetic thermoplastic hydrocarbon resin and an oil selected from the group consisting of aromatic oil, naphthenic oils, and mixtures thereof, preferably in an aromatic solvent which is later removed. Small amounts of rubber can be added to improve the product properties as required. The resulting binding material has properties comparable with asphalt binders and has the added advantage of being capable of imparting a light color to aggregate type pavements which can be pigmented to impart any desired color to the pavement.

Thus, for example, the resin comprising about 30 to about 60 parts by weight of the binder is added to the previously specified plasticizing oil comprising about 40 to about 60 parts by weight of the binder, and heated with stirring until the resin is dissolved, preferably in a convenient quantity of aromatic solvent. The amount of solvent is not critical, and an example of a convenient quantity of solvent is an amount of aromatic solvent equal in weight to the weight of the resin and oil mixture of a solvent, such as benzene, toluene, xylene, or any mixture of these or any other aromatic solvents.

The plasticizing oil can be added to the solvent before or at the same time the synthetic hydrocarbon resin is added. The addition is conveniently performed at atmospheric pressure and at a temperature between 100° and 260° F. with vigorous stirring until the resin has been dissolved into the solution. To improve the cold weather ductility of pavements utilizing the binder of this invention, it is preferred to add from about 1 to about 10 parts by weight of a hydrocarbon rubber as aforesaid to the solvent before the resin and aromatic and/or naphthenic oils are added. The rubber is added to the solvent at a solvent temperature of 100–260° F. and stirred vigorously for several hours until the viscosity of the rubber-solvent solution remains constant.

After the resin and oil have been added and dissolved into solution, the solvent or solvent mixture is removed by stripping in vacuo or by any other solvent removing process. The stripping is readily performed at atmospheric pressure at the boiling point of the solvent or solvent mixture or at lower temperatures if reduced pressure is used.

Light colored paving material can be readily prepared by placing a preheated mixture of crushed rock, gravel, sand or combination thereof and mineral filler, such as rock dust, in any of the mixing devices common to the road paving art, such as a plug mill; adding into the above mixture a preheated binder of the present invention; and mixing the above ingredients until thoroughly mixed. A good working mixture is obtained when both the aggregate mixture and the binder are preheated to a temperature of between 200° and 500° F.

In the absence of pigment the product is light colored. If colored paving material is desired, coloring pigment comprising between about 1% and about 5% of the mixture, depending upon the deepness of color desired, the shade desired, and the number of various colored pigments making up the pigment charge, is added to the paving composition while still in a heated condition, preferably after the binder has been blended into the composition, and is blended until the composition is colored throughout. The paving material is then collected from the mixing device for use. A similar blending operation is used to prepare compositions which are to be extruded.

The following examples are presented as methods of preparation of binders of this invention by way of illustration and are not intended to limit the scope of this invention.

EXAMPLE 1

A 700 gm. sample of a binder of this invention was prepared in the following manner:

Crumb styrene-butadiene rubber (28 gm.) having a Mooney viscosity ML 4 min. at 212° F. of .046-0.054 inch, which can be purchased as Ameripol 1006, was added to benzene (approximately 570 gm.) and the mixture was heated and stirred for about 10 hours at a temperature of from 110 to 140° F. Samples were checked for viscosity at hourly intervals until the viscosity remained constant during several checks. The viscosity of this mixture remained constant after 10 hours. Aromatic oil (350 g.) having a viscosity of 262 S.S.U. at 210° F. and an aniline point of 46° C., and a naphthenic oil (42 gm.) consisting essentially of a mixture of viscous cycloparaffinic compounds and having a viscosity of 89 S.S.U. at 210° F. and an aniline point of 75° C., were added to the hot solvent mixture and the resulting mixture stirred for a period of approximately ½ hour until the oils were dissolved. At the end of this period, crushed substantially completely polymerized synthetic aromatic thermoplastic hydrocarbon resin, softening point 238° F. (380 gm.) having a mixed aniline point of 31.6° C., an iodine number of 125, an acid number of 0, and a molecular weight range of 800–1200 as determined by cryoscopic means was added and the stirring was continued for 1 to 2 hours until the resin was dissolved. The benzene solvent was removed from the solution by heating in vacuo and collected for reuse. The resin employed in this and the following examples can be prepared as described in U.S. Patent No. 2,798,866.

The binding material thus produced was within the following specification for aggregate pavement binders:

(1) Penetration (ASTM Method D–5–52) ---- 65–79.
(2) Viscosity, SSF/275° F., sec. ----------- 250–350.
(3) Fluidity Factor Calculate from (1) and (2) above ------------------------------ 140–260.
(4) Loss on Heating, 325° F., 5 hrs. 50 gm. sample ------------------------------- <0.25%.
(5) Percent Loss in Penetration on Heating (ASTM Method D–5–52 on 50 gm. sample heated at 325° F. for 5 hours) ----------- <25%.
(6) Loss in Penetration of Heating (ASTM Method D–5–52 on 50 gm. sample heated at 325° F. for 24 hours) ----------------- <40%.
(7) Ductility (ASTM Method D–113–44) with T=32° F., pull out rate of ¼ cm./min. -------------- Min. 10% of 77° F. penetration.

EXAMPLE 2

A 700 gm. sample of a binder of this invention was prepared in the following manner:

Crumb styrene-butadiene rubber (28 gms.) was added to benzene (approximately 570 gms.) and dissolved in the manner presented in Example 1. Aromatic oil (400 gm.) having a viscosity of 267.8 S.S.U. at 210° F. and an aniline point of 42° C., was added to the hot solvent mixture and the resulting mixture stirred for a period of approximately ½ hour until the oil was dissolved. To this solution, substantially completely polymerized synthetic aromatic thermoplastic hydrocarbon resin, softening point 241° F., (272 gm.), having a mixed aniline point of 31.3° C., an iodine number of 120, an acid number of 0, and a molecular weight range of 800–1200 as determined by cryoscopic means, was added with stirring until the resin dissolved into solution. The benzene solvent was removed from the solution in vacuo and collected for reuse.

The binding material produced in this example has the same properties as the material produced as in Example 1, with the exception of the ductility which was slightly lower.

EXAMPLE 3

A 700 gm. sample of a binder of this invention was prepared in the following manner:

Crumb styrene-butadiene rubber (28 gm.) was added to benzene (approximately 570 gm.) and the mixture was heated and stirred for about 10 hours at a temperature from 110° to 140° F. The solution was sampled at hourly intervals and the viscosity measured until the viscosity remained constant during several checks. The viscosity of the solution remained constant after 10 hours. Aliphatic naphthenic oil (294 gm.) consisting essentially of a mixture of viscous cycloparaffinic compounds and having a viscosity of 86 S.S.U. at 210° F. and an aniline point of 75° C., was added to the hot solvent solution and the resulting mixture was stirred for a period of approximately ½ hour until the oil dissolved into solution. At the end of this period, crushed substantially completely polymerized synthetic aromatic thermoplastic hydrocarbon resin, softening point 237° F. (378 gm.), having a mixed aniline point of 31.7° C., and iodine number of 122, and acid number of 0, and a molecular weight range of 800–1200 as determined by cryoscopic means, was added and the stirring was continued for about 1 to 2 hours until the resin was dissolved. The benzene solvent was removed from the solution by heating in vacuo and was collected for reuse; the binder remaining in the flask.

EXAMPLE 4

A 700 gm. sample of a binder of this invention was prepared in the following manner:

Crumb isoprene rubber (14 gm.) was added to aromatic oil (364 gm.) having a viscosity of 267.8 S.S.U. at 210° F. and an aniline point of 42° C., and aliphatic naphthenic oil (42 gm.) consisting essentially of a mixture of viscous cycloparaffinic compounds and having a viscosity of 89 S.S.U. at 210° F. and an aniline point of 75° C. The resulting mixture was heated and stirred for about 24 hours at a temperature which was slowly increased from about 110° F. to about 200° F. At the end of this time the rubber was fully dissolved into solution, and crushed substantially completely polymerized synthetic aromatic thermoplastic hydrocarbon resin, softening point 242° F. (280 gm.) having a mixed aniline point of 31.8° C., an iodine number of 125, an acid number of 0, and a molecular weight range of 800–1200 as determined by cryoscopic means was added. The stirring was continued for an additional hour, at which time the resin was dissolved into solution. The resulting solution was a binder of the present invention.

EXAMPLE 5

A 700 gm. sample of a binder of this invention is prepared in the following manner:

Crushed substantially completely polymerized synthetic aromatic thermoplastic hydrocarbon resin (294 gm.) softening point 245° F., having a mixed aniline point of 35.2° C., an iodine number of 120, an acid number of 0, and a molecular weight range of 800–1200 as determined by cryoscopic means is added to aromatic oil (370 gm.) having a viscosity of 262 S.S.U. at 210° F. and an aniline point of 46° C. and aliphatic naphthenic oil (36 gm.) consisting essentially of a mixture of viscous cycloparaffinic compounds having a viscosity of 89 S.S.U. at 210° F. and an aniline point of 75° C. The resulting mixture is heated and stirred for about 2 hours at a temperature of from about 100° F. to about 120° F. The heating is stopped when all components have dissolved into solution. The resulting solution is a binder of the present invention.

EXAMPLE 6

A 700 gm. sample of a binder of this invention is prepared in the following manner:

Crushed substantially completely polymerized synthetic aromatic thermoplastic hydrocarbon resin, softening point 220° F. (392 gm.), having a mixed aniline point of 35.8° C., an iodine number of 120, an acid number of 0, and a molecular weight range of 800–1200 as determined by cryoscopic means is added to aliphatic naphthenic oil (308 gm.) consisting essentially of a mixture of viscous cycloparaffinic compounds and having a viscosity of 86 S.S.U. at 210° F. and an aniline point of 75° C. The mixture is heated and stirred for approximately 2 hours at a temperature of from about 100° F. to about 120° F. The heating is stopped when the resin has dissolved into solution. The resulting solution is a binder of the present invention.

EXAMPLE 7

One hundred pounds of a light colored aggregate paving material or extrudable mass is prepared in the following manner:

Sand (38 pounds), broken rock (52 pounds), and mineral filler (4.5 pounds) are heated to a temperature of approximately 335° F. and placed in a pug mill. A binder prepared as described in Example 1 (5.5 pounds) is simultaneously heated to a temperature of approximately 335° F. and added to the pug mill. The mixture is blended for approximately 5 to 35 minutes and then ejected from the pug mill as the finished material.

EXAMPLE 8

One hundred pounds of a colored aggregate paving material or extrudable mass is prepared in the following manner:

Sand (38 pounds), broken rock (52 pounds), and mineral filler (2 pounds) are heated to a temperature of approximately 335° F. and placed in a pug mill. A binder prepared as described in Example 1 (5.5 pounds) is simultaneously heated to a temperature of approximately 335° F. and added to the pug mill. The mixture is blended for approximately 5 to 35 minutes. Coloring pigment (2.5 pounds) is added, the mixture blended for several additional minutes, and the product then ejected from the pug mill.

The binders of this invention are useful as the binding material of mineral aggregate compositions, such as those used in the building and paving trades. These binders are especially useful for solidifying aggregate material for use as roads, walks, athletic and recreational areas, and the like, because they impart a light color to said pavements. The above mentioned pavements can also be constructed in any desired color by pigmenting the blended aggregate composition with a suitably colored pigment. This latter feature is extremely useful in making safety lanes or islands, dividing strips, intersections, speed zones, pedestrian crossing lanes, and the like.

The binders of this invention are also useful to bind mineral aggregate into masses which can be extruded in thermoplasticized condition into various shapes and forms. Such extruded shapes are especially useful, as for example, for curbing, which can be extruded at the construction site and positioned without the necessity of form enclosures, and the like; and for culverts and drainage tile, which can be pre-formed by extrusion.

Pavements composed of mineral aggregate and a binder of this invention have improved feathering properties and therefore, better retain vertical edges with less break-off and slope than do pavements using asphalt as a binder. Pavements formed from the compositions of this invention do not creep under the rolls of pressure rollers when in a heated condition, and therefore, are easier to spread, smooth, and compact.

We claim:

1. A paving material comprising from about 85 to about 98 parts by weight of mineral road paving aggregate material up to about one-half inch in diameter, and from about 2 to about 10 parts by weight of a binder composition therefor, said binder composition comprising from about 1 to about 10 parts by weight of a hydrocarbon rubber; from about 30 to about 60 parts by weight substantially completely polymerized, aromatic, thermoplastic, petroleum-derived hydrocarbon resin having a softening point range of from about 220° to about 300° F., a mixed aniline point of from about 20 to about 60° C., an iodine number of from about 70 to about 160, an acid number of from 0 to about 4 and a molecular weight of from about 600 to about 1400 as determined by cryoscopic means; and from about 40 to about 60 parts by weight viscous oil selected from the group consisting of aromatic oil having a viscosity of from about 200 to about 300 S.S.U. at 210° F. and an aniline point of from about 20 to about 60° C., naphthenic oil consisting essentially of a mixture of viscous cycloparaffinic compounds having a viscosity of from about 50 to about 200 S.S.U. at 210° F. and an aniline point of from about 50 to about 150° C., and mixtures thereof, and said binder composition having a penetration of at least about 65 and a viscosity of between about 250 and 350 Saybolt seconds furol at 275° F.

2. A paving material comprising from about 85 to about 98 parts by weight of mineral road paving aggregate up to about one-half inch in diameter and from about 2 to about 10 parts by weight binder composition therefor, said binder composition comprising from about 1 to about 10 parts by weight hydrocarbon rubber; from about 30 to about 60 parts by weight substantially completely polymerized aromatic, thermoplastic, petroleum-derived hydrocarbon resin having a softening point range from about 220° to about 300° F. and a mixed aniline point of from about 20 to about 60° C.; and from about 40 to about 60 parts by weight viscous oil selected from the group consisting of aromatic oil having an aniline point of from about 20 to about 60° C., naphthenic oil consisting essentially of a mixture of viscous cycloparaffinic compounds having an aniline point of from about 50 to about 150° C., and mixtures thereof, and said binder composition having a penetration of at least about 65 and a viscosity of between about 250 and 350 Saybolt seconds furol at 275° F.

3. A paving material comprising from about 85 to about 98 parts by weight of mineral road paving aggregate material up to about one-half inch in diameter, coloring pigment, and from about 2 to about 10 parts by weight of a binder composition therefor, said binder composition comprising from about 1 to about 10 parts by weight hydrocarbon rubber; from about 30 to about 60 parts by weight substantially completely polymerized, aromatic, thermoplastic petroleum-derived hydrocarbon resin having a softening point range from about 220° to about 300° F. and a mixed aniline point of from about 20 to about 60° C.; and from about 40 to about 60 parts by weight viscous oil selected from the group consisting of aromatic oil having an aniline point of from about 20 to about 60° C., naphthenic oil consisting essentially of a mixture of viscous cycloparaffinic compounds having an aniline point of from about 50 to about 150° C., and mixtures thereof, and said binder composition having a penetration of at least about 65 and a viscosity of between about 250 and 350 Saybolt seconds furol at 275° F.

4. A colored road paving material comprising about 92% mineral aggregate up to about one-half inch in diameter, about 3% coloring pigment and about 5% of a binder therefor, said binder composition comprising from about one to about 10 parts by weight of a hydrocarbon rubber; from about 30 to about 60 parts by weight substantially completely polymerized, aromatic, thermoplastic, petroleum-derived hydrocarbon resin having a softening point range of from about 220° to about 300° F., a mixed aniline point of from about 20 to about 60° C., an iodine number of from about 70 to about 160, an acid number of from about 0 to about 4, and a molecular weight of from about 600 to about 1400 as determined by cryoscopic means; and from about 40 to about 60 parts by weight viscous oil selected from the group consisting of aromatic oil, naphthenic oil consisting essentially of a mixture of viscous cycloparaffinic compounds, and mixtures thereof, and said binder composition having a penetration of at least about 65 and a viscosity of between about 250 and 350 Saybolt seconds furol at 275° F.

References Cited by the Examiner

UNITED STATES PATENTS

| | | | |
|---|---|---|---|
| 2,649,428 | 8/1953 | Moore et al. | 260—33.6 |
| 2,700,655 | 1/1955 | Endres et al. | |
| 2,798,866 | 7/1957 | Gordon et al. | 260—82 |
| 2,823,194 | 2/1958 | McKay et al. | 260—82 |
| 2,836,581 | 5/1958 | Gordon | 260—82 |
| 2,925,831 | 2/1960 | Welty et al. | 94—22 |
| 3,070,570 | 12/1962 | Gessler et al. | 260—41 |
| 3,093,601 | 6/1963 | Gessler et al. | 260—41 |

MORRIS LIEBMAN, *Primary Examiner.*

B. A. AMERNICK, *Assistant Examiner.*